United States Patent [19]

Lamphere et al.

[11] Patent Number: 5,224,837
[45] Date of Patent: Jul. 6, 1993

[54] APPARATUS FOR RECOVERY OF LIQUID HYDROCARBON

[75] Inventors: David A. Lamphere, Westford; David F. Bowles, Ferrisburg, both of Vt.

[73] Assignee: Clean Earth Technology, Inc., North Ferrisburgh, Vt.

[21] Appl. No.: 693,956

[22] Filed: Apr. 29, 1991

[51] Int. Cl.[5] .............................................. F04B 21/00
[52] U.S. Cl. ........................................ 417/63; 417/37; 210/104
[58] Field of Search ........................... 417/63, 36, 37; 210/104

[56] References Cited

U.S. PATENT DOCUMENTS

| | | | |
|---|---|---|---|
| 4,226,714 | 10/1980 | Furness et al. | 210/104 |
| 4,273,650 | 6/1981 | Solomon | 210/104 |
| 4,466,777 | 8/1984 | Kimberlin | 417/63 |
| 4,469,170 | 9/1984 | Farmer, Jr. | 166/53 |
| 4,663,037 | 5/1987 | Breslin | 210/170 |
| 4,752,188 | 6/1988 | Gurega | 417/36 |
| 4,916,940 | 4/1990 | Mougne | 73/61.1 |

Primary Examiner—Richard A. Bertsch
Assistant Examiner—Charles G. Freay
Attorney, Agent, or Firm—Lahive & Cockfield

[57] ABSTRACT

A pump unit for recovery of hydrocarbon liquid from atop water in a well includes a hydrocarbon pump intake with a linear probe for indicating the position of the pump intake relative to the hydrocarbon/water interface on a control panel, so that its relative position can be monitored and changed. The probe has a conductive member coated with a non-conductive coating, and is attached to a source of low frequency electrical signal. The strength of a signal output from the probe indicates the position of the probe, and the pump intake, relative to the hydrocarbon/water interface and controls a display on a control panel. Furthermore, the signal can be used to control the hydrocarbon/water interface relative to the pump intake by such means as pumped water from under the pump intake in a controlled manner to change said interface relative to the intake or by means of a motorized lift to reposition said pump intake relative to the interface.

3 Claims, 5 Drawing Sheets

APPARATUS FOR RECOVERY OF LIQUID HYDROCARBON

FIELD OF THE INVENTION

This invention relates to apparatus and methods for the recovery of liquid hydrocarbon based products (e.g., oil, gasoline, etc.) present in groundwater through spills and leakage, and particularly to apparatus and methods used with wells driven into the ground to facilitate such recovery.

BACKGROUND OF THE INVENTION

One method for the recovery of liquid hydrocarbon present in the ground, where it floats atop the groundwater, involves the drilling of a well to below the water table. The method is described in U.S. Pat. No. 4,273,650 to Solomon, for example. A perforated well casing is inserted into the well, and water and hydrocarbon seep into the well through the perforated casing. By pumping water from the bottom of the well with a submersible pump, a cone-shaped depression in the water table occurs with the well as the center of the cone. The lighter hydrocarbon liquid collects in the well on top of the water, and is removed by a second, hydrocarbon, pump located at a fixed position near the liquid surface in the well.

The second pump has associated with it a point sensor that signals when the water/hydrocarbon interface is high, where the pump shuts off so that it will not pump out water instead of hydrocarbon. Another point sensor signals when the water/hydrocarbon interface is low, so that the second pump can operate, and pump out hydrocarbon.

Various improvements in this system have been suggested. Farmer, in U.S. Pat. No. 4,469,170, discloses a floating pump and sensor assembly. The floating assembly still includes only point sensors, so that the pump operates when a lower sensor is activated by the water/hydrocarbon interface, and shuts off when a higher sensor is activated by the rising water/hydrocarbon interface. Breslin, in U.S. Pat. No. 4,663,037, discloses a floating pump that relies on the specific gravity of the pump to float at an appropriate depth near the water/hydrocarbon interface, and has a hydrocarbon intake at the top of the pump, above the interface.

However, the optimum location of the intake of the hydrocarbon pump relative to the hydrocarbon/water interface varies at different stages of the operation of the system. When the depth of hydrocarbon above the water interface is great, the hydrocarbon pump intake is preferably a substantial distance above the interface, so that hydrocarbon instead of water is more certainly pumped out. When the depth of hydrocarbon above the water interface is shallow, the hydrocarbon pump inlet has to be very close to the water interface so that it can still pump out hydrocarbon.

SUMMARY OF THE INVENTION

Accordingly, the invention provides a hydrocarbon pump unit for recovery of liquid hydrocarbon from a body of liquid with a hydrocarbon/water interface, comprising a pump with a pump intake, and a linear probe, fixed in relation to the pump intake and oriented to extend perpendicularly to the hydrocarbon/water interface when in use, the probe including signalling means for generating a signal indicative of the linear location of the hydrocarbon/water interface relative to the pump intake.

Preferably, the probe signalling means includes means for generating a continuously varying signal indicative of the continuously varying linear location of the interface relative to the pump intake. It preferably also includes receiving means for receiving the signal, and display means responsive to the signal for displaying the relative location of the interface relative to the pump intake. Also, the linear probe may include a linearly extending electrically conductive member, with a non-conductive coating on the member, and means for exciting the conductive member with a low frequency electrical signal.

The invention also comprises a method for recovering liquid hydrocarbon from a well containing liquid hydrocarbon and water that define a hydrocarbon/water interface, comprising the steps of locating a pump with a pump intake above the hydrocarbon/water interface, determining the linear position of the pump intake relative to the interface, operating the pump when the pump intake is surrounded by hydrocarbon, and knowingly varying the linear position of the pump relative to the interface to maximize operation of the pump.

Preferably, the method further includes pumping water from the well to change the location of the hydrocarbon/water interface, at varying rates through a conduit controlled by a valve, the duty cycle of which varies the water flow and thus raises or lowers the hydrocarbon/water interface as desired, while maintaining near continuous operation of the water pump.

BRIEF DESCRIPTION OF THE DRAWINGS

Other objects, features and advantages of the invention will be described or will be apparent from the following description of a preferred embodiment of the invention, including the drawings thereof, of which.

DESCRIPTION OF PREFERRED EMBODIMENTS

Figure 1:
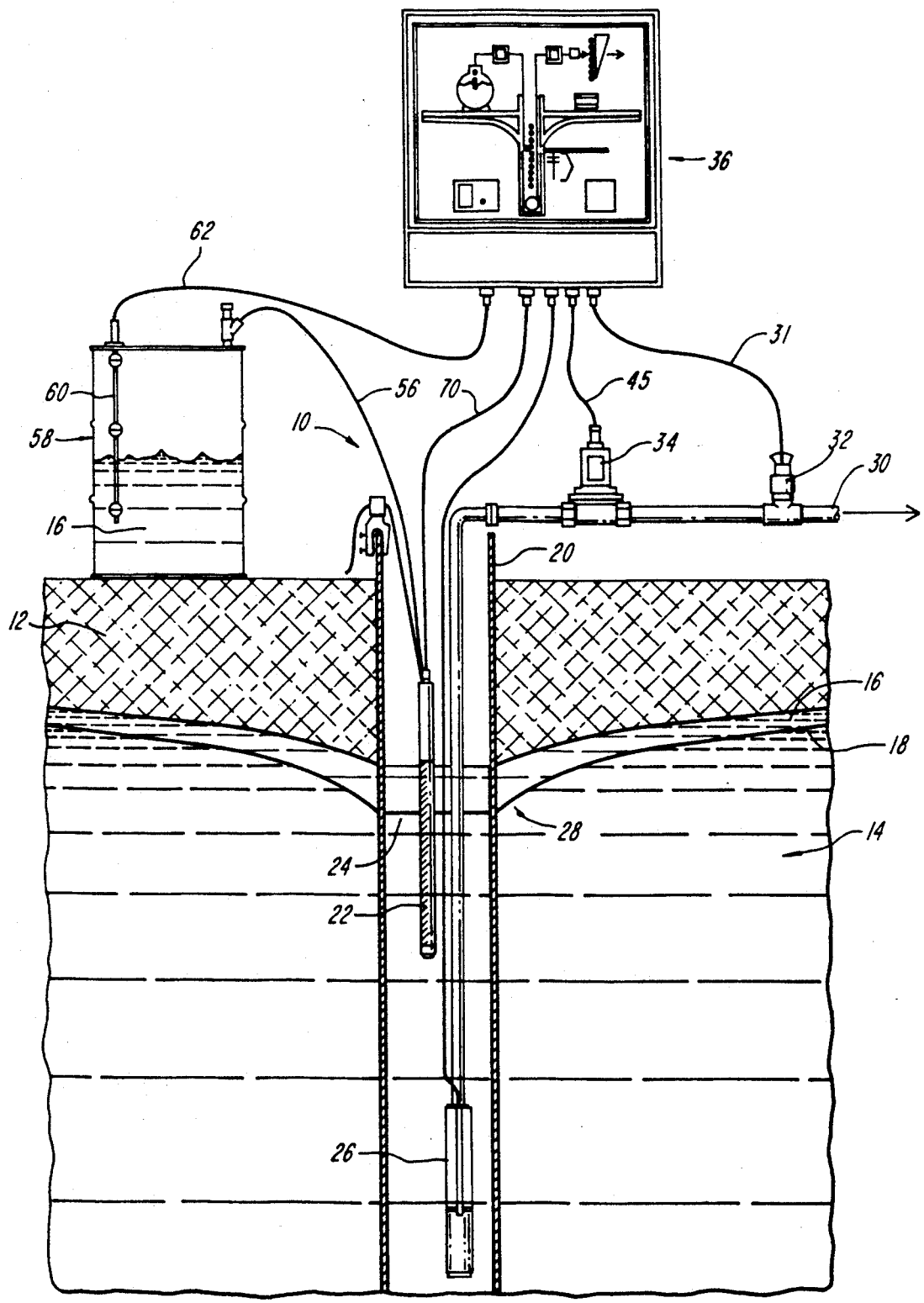
FIG. 1 is a diagrammatic view of a system incorporating the invention, utilizing a water depression mode of operation.

Referring now to FIG. 1, there is shown a well 10 drilled into the ground 12 in a location where the groundwater 14 has been contaminated by liquid hydrocarbon 16 such as oil or gasoline. The contamination can result from a spill above the ground or from seepage from an underground tank or pipe. Since liquid hydrocarbon is lighter than water, it will accumulate above the water in the water table 18.

Figure 3:
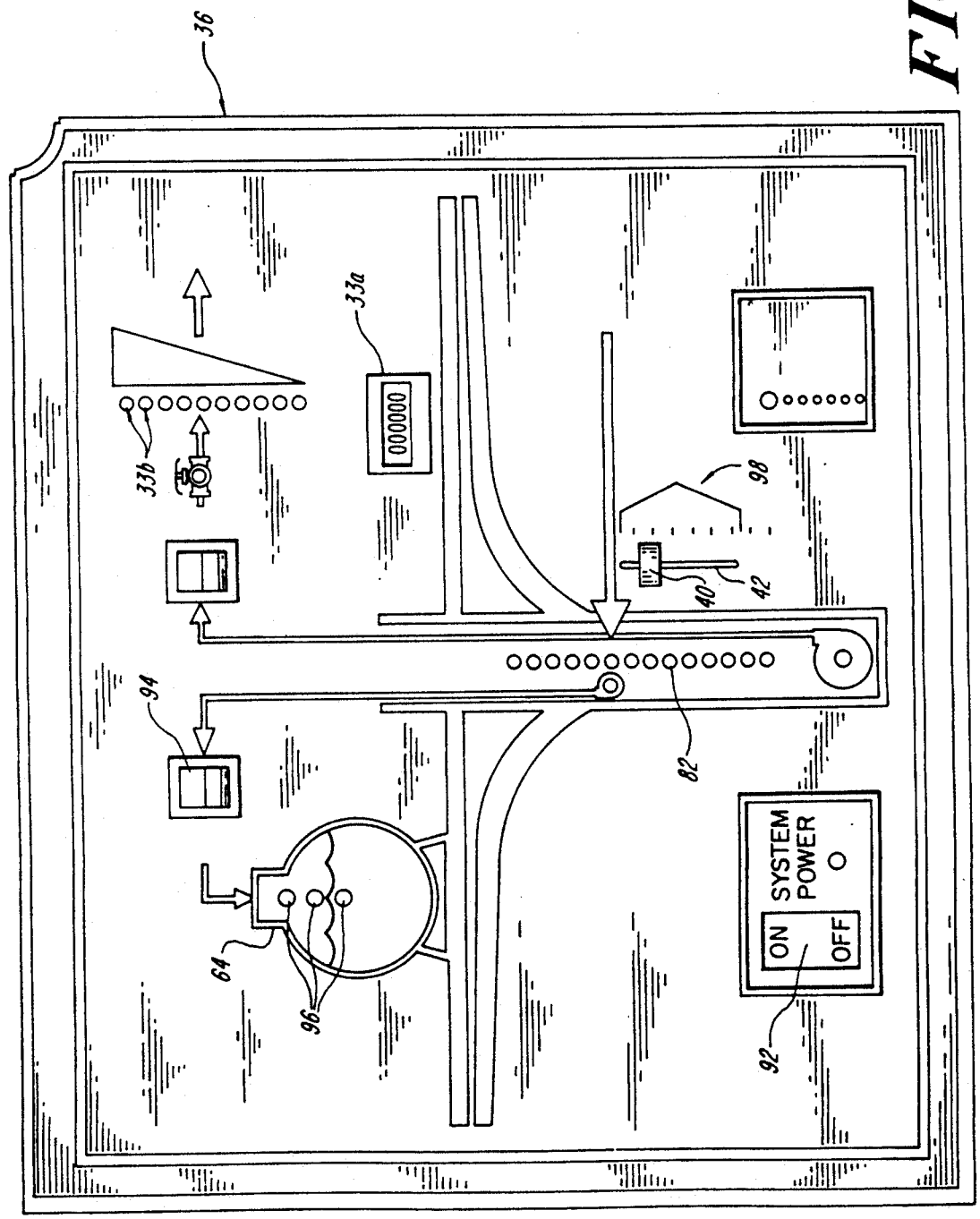
FIG. 3 is a view of a control panel for operating the system of the invention.

The well 10 is drilled to a depth below the water table 18, and a well casing 20 is inserted into the well cavity. The well casing 20 is perforated so that liquid hydrocarbon 16 and water 14 from the surrounding ground 12 can seep into the well 10. A hydrocarbon pump unit 22 is located at the hydrocarbon/water interface 24 to pump out hydrocarbon 16. A conventional submersible water pump 26 is located at the bottom of the well 10 to pump out water, creating a depression 28 in the water table 18 centered at the well 10. The pumped out water 14 passes through a conduit 30 such as a pipe or hose, and through a flow meter 32, to treatment, such as an aeration tower (not shown), and eventual return to the ground. In the system shown in FIG. 1, the water also passes through a solenoid valve 34, which is electrically controlled to vary the volume of water passing through the conduit 30. A control panel 36 with a graphic display (see FIG. 3) is located at some above ground location where an operator can monitor and operate the system. The flow meter 32, for example, sends a signal through a connecting cable 31, to a display on the panel 36, including both an indicator 33a of total gallons pumped and an array of LED indicators 33b showing the rate of pumping.

Figure 4:
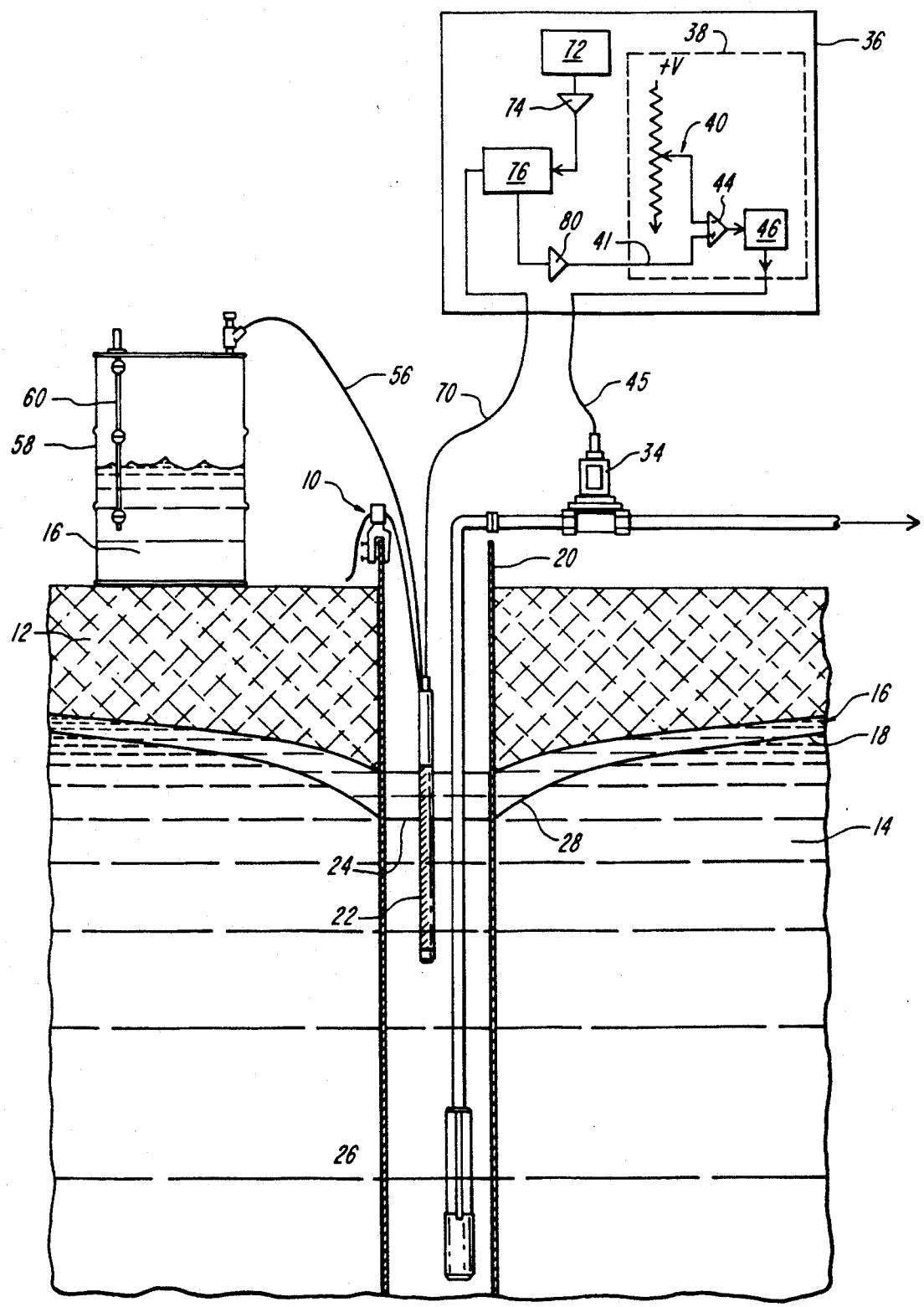
FIG. 4 is a schematic diagram showing some of the electronic control circuitry used in the system.

Generally, there is some volume of flow of water from the submersible pump 26 that achieves an appropriate balance between lowering the water 14 in the well 10 enough to draw more water and hydrocarbon pump into the well, but not so much that the hydrocarbon pump unit 22 for drawing off hydrocarbon 16 above the water 14 is rendered ineffective. An electronic flow control circuit 38 in the panel 36 compares the desired position of the hydrocarbon pump 22 relative to the hydrocarbon/water interface 24 and varies the duty cycle of the solenoid valve 34 accordingly (see FIG. 4). A control lever 40 on the control panel 36, slidable in a slot 42, sets the desired position of the hydrocarbon pump 22 relative to the hydrocarbon/water interface 24. The flow control circuit 38 compares the signal set by the lever 40 to a signal 41 from the pump unit 22, by means of a signal comparator 44, and sends the resulting signal to a duty cycle controller 46 that automatically varies the duty cycle of the solenoid valve 34 appropriately through cable 45, to control the outward flow of water 14, while leaving the water pump 26 running in a continuous or near continuous mode. This provides for a very responsive and automatic water table depression control as opposed to starting and stopping the water pump 26. In place of the solenoid valve 34 a motor control valve (not shown) may be used to proportionately open or close slightly in response to settings of the control lever 40 and the flow control circuit 38 such as to maintain the water/hydrocarbon interface level as required.

Figure 2:
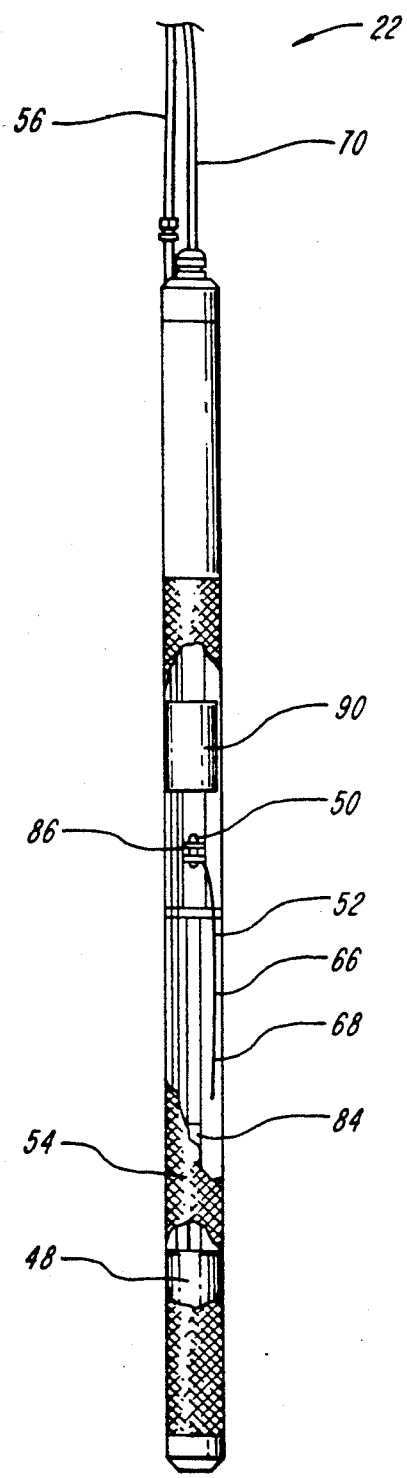
FIG. 2 is a side view of the hydrocarbon pump unit of the system, with portions of the pump unit inlet screen broken away to show the interior of the unit.

FIG. 2 shows the hydrocarbon pump unit 22 that is inserted into the well 10 and maintained in position at the hydrocarbon/water interface 24. The pump unit 22 is cylindrical to conform to the well casing 20 and essentially comprises a hydrocarbon pump 48 with an intake 50 for drawing in hydrocarbon liquid 16, a linear probe 52, fixed in relation to the pump intake 50 for determining the linear location of the hydrocarbon/water interface 24 relative to the pump intake 50, and an inlet screen 54.

The pump 48 of the unit 22 is conventional, and readily available. Its purpose is to pump hydrocarbon liquid 16 from atop the water 14 in the well 10, through a conduit 56, to a tank 58 where the hydrocarbon 16 is collected for disposal. The tank 58 for collection of hydrocarbon 16 includes a conventional fluid level monitor 60 and a cable 62 for transmitting a signal indicating that level to a fluid level indicator 64 on the control panel 36, where it can be monitored by the operator.

The probe 52 of the hydrocarbon pump unit 22, which locates the relative linear location of the interface 24, includes an electrically conductive member of suitable length 66 arranged to be coaxial with the well 10 and perpendicular to the hydrocarbon/water interface 24. The conductor 66 is coated with a non-conductive coating 68 such as the synthetic fluorine sold under the trademark Teflon. The conductor 66 is connected by a cable 70 to a source of a low frequency electrical signal, such as a low frequency oscillator 72 and a driver amplifier 74. In effect, the coated conductor 66 acts like an antenna.

The system also includes a signal detector 76, for measuring the amount of drive current required to drive the coated conductor 66. The output signal from the detector 76 depends on how much of the antenna 66 is immersed in water. This is because the water is relatively conductive and acts as a shield around the antenna 66. Hydrocarbons, on the other hand, are relatively non-conductive and therefore do not act as a shield. As more of the antenna 66 is immersed in the water, the drive current increases. The drive current in fact is proportional to the extent of immersion of the antenna 66 below the hydrocarbon/water interface 24. The amplitude of the drive current is then a continuously varying signal that indicates the continuous linear position of the pump inlet to the interface. The control panel 36 has suitable conventional circuitry, including a receiver amplifier 80, to receive the signal, send it to the signal comparator 44 of the valve control circuit 38 and also display it. For example, in the control panel 36 shown (see FIG. 3), a series of dual color LED's 82 (light emitting diodes) indicate the level of the interface 24 with respect to the pump intake 50. Circuitry is provided so that an LED 82 is activated green to indicate water and red to indicate hydrocarbon.

The pump unit 22 also includes two independent back up point sensors, a high limit sensor 86 located just under the intake 50 and a low limit sensor 84 located below the linear probe 52. The sensors 84, 86 are similarly constructed and utilize the same concept as the linear probe 52 of a low frequency antenna whose signal is changed by the shielding effect of the water. Each of these sensors 84, 86, however, may be configured as a horizontal loop of insulated wire as the antenna, thus obtaining its full signal change within 0.1" of change in the level of the water/hydrocarbon interface 24 they are monitoring. The back up sensors 84, 86 are connected to control circuitry in the panel 36 to automatically turn off the hydrocarbon pump 48 when the water/hydrocarbon interface is above the high limit sensor 86 or below the low limit sensor 84.

Furthermore, the location of the liquid/air interface is also found, with a conventional liquid level finding system such as floats capacitance, thermistor beads or optical sensor. In the preferred embodiment, the probe includes a magnet embedded in a float 90, that activates a number of reed switches (not shown) placed at incremental heights inside the unit 22. The signal from these switches is transmitted to the control panel 36, where it is received and conventional circuitry is used to provide which LED's 82 should be turned off completely to indicate the absence of surrounding liquid of any type.

Thus, it can be seen that the control panel indicates the location of the pump intake 50 relative to the hydrocarbon/water interface 24 and also the depth of the hydrocarbon layer 16. The pump 48 is fixed in its position, but turned on or off only when an appropriate level of interface 24 exists or is created by operation of the submersible water pump 26.

Operation of the system shown in FIG. 1 takes place as follows. The pump and probe unit 22 is lowered into the well 14 until it is at some suitable position below the the hydrocarbon/water interface 24. When the system is turned on by switch 92 on control panel 36 the submersible pump 26 will pump water 14 out until the hydrocarbon/water interface 24 falls below the hydrocarbon pump intake 50 as shown in the control panel LED's 80: green for water, red for hydrocarbon, off for the absence of liquid. The hydrocarbon pump 48 is then turned on by the pump switch 94 on the control panel 36, as long as there is hydrocarbon 16 available to pump and there is capacity in a hydrocarbon receiving tank 58. Lights 96 on the control panel fluid level indicator 64 indicate the general height of hydrocarbon 16 in the tank 58: the lights 96 indicate how many feet from the maximum level of the tank capacity are left. When the tank 58 reaches its capacity, of course, the hydrocarbon pump 48 will automatically be shut off.

The slide control lever 40 on the control panel 36 is used by the operator to set the desired distance between the pump intake 50 and the hydrocarbon/water interface 24 as shown by a calibrated scale 98 located next to the lever 40. The solenoid valve 34 is automatically operated to let water through conduit 30 if the interface has to be lowered to achieve the desired relative position, or restricts flow if the level of the interface has to rise. Ordinarily the operator will set the interface level 24 well below the pump intake 50 at the initial stages of a clean up operation, when there may be biological growth at the hydrocarbon/water interface that could clog the pump or piping. During the final stages of a clean up operation the pump intake 50 can be set closer to the interface level 24 (within a fraction of an inch of the pump intake) when it is necessary to skim off the remaining hydrocarbon.

In alternative systems, the hydrocarbon pump unit 22 may be used in a well 10 without a submersible pump. The pump unit 22 may be simply lowered into the well, by hand, or mechanically, until the hydrocarbon/water interface 24 is indicated on the control panel 36 as being at the appropriate level relative to the pump intake 50, and the pump 48 will then be automatically turned on.

Figure 5:
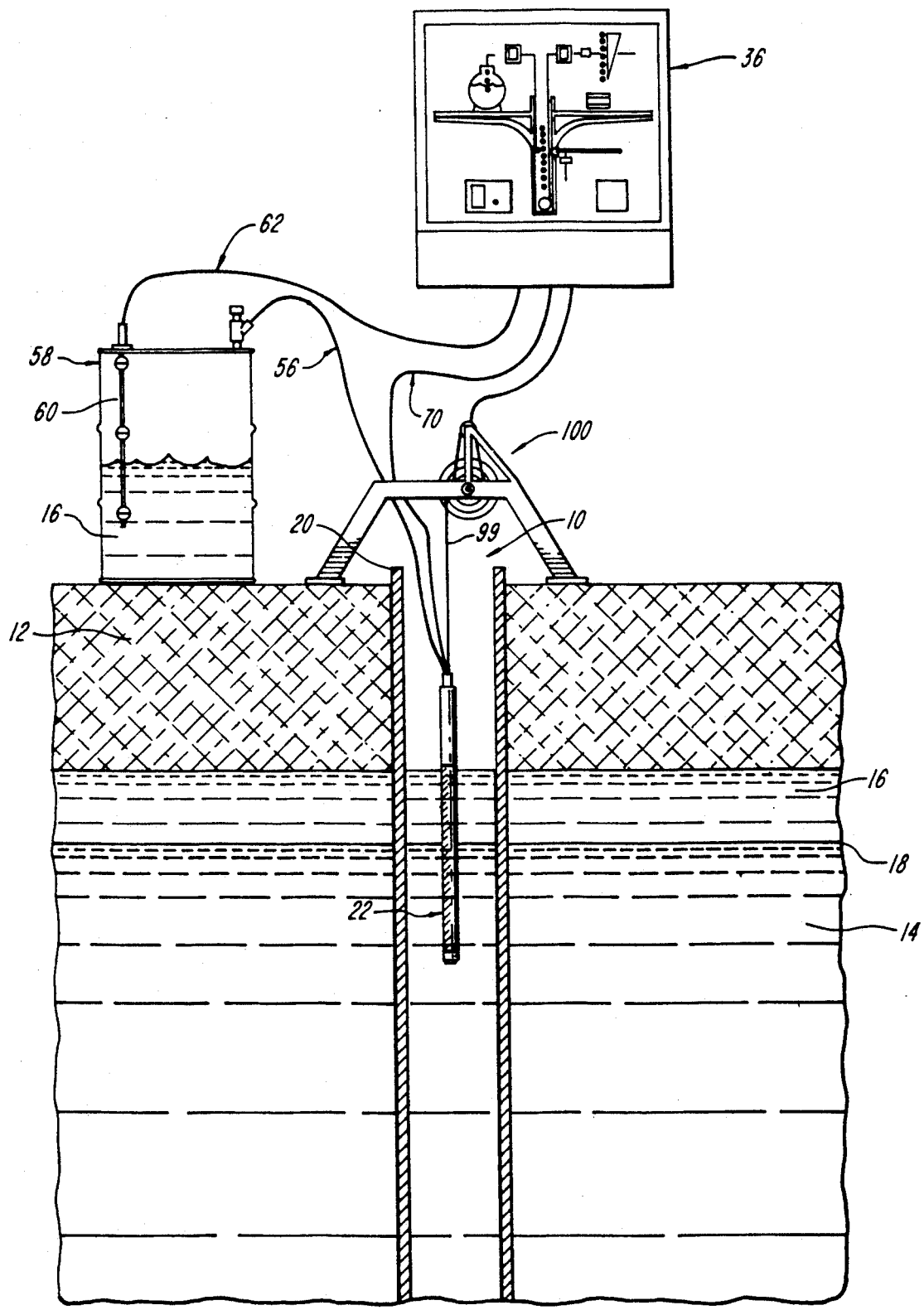
FIG. 5 is a diagrammatic view of an alternative system utilizing an automatic hydrocarbon pump positioning system.

As shown in FIG. 5, for example, in an optional scheme without water depression, the pump unit 22 is suspended by a cable 99 from a pump lift, such as an electric winch 100, which is controlled from the control panel 36. Its location in the well 10 is determined by the operation of the winch 100. The pump unit 22 is raised or lowered until its pump intake 50 is just above the hydrocarbon/water interface 24 in the well 10 as determined by the linear probe 52 in the pump unit 22.

Furthermore, the interface measurement portion of the hydrocarbon pump unit probe, while shown as linear, may take the form of a rod or a plate or a loop of wire. Other embodiments of the invention may occur to those skilled in the art, and are considered to be within the scope of the following claims.

What is claimed is:

1. A pump unit for recovery of liquid hydrocarbon form a body of liquid with a hydrocarbon/water interface, comprising a pump with a pump intake, and a linear probe, fixed in relation to said pump intake, and oriented to extend perpendicularly to said hydrocarbon/water interface and through said hydrocarbon/water interface, when in use, said probe including antenna means for generating an electromagnetic signal and electrical driving means for driving said antenna means, said driving means including signalling means for generating a signal indicative of the linear location of said hydrocarbon/water interface relative to said pump intake, wherein said linear probe includes a linearly extending electrically conductive member comprising said antenna means, a non-conductive coating on said conductive member, and means for electrically driving said conductive member with a low frequency electrical signal.

2. The pump unit of claim 1 wherein said signalling means includes means for generating a continuously varying signal indicative of the continuously varying linear location of said hydrocarbon/water interface relative to said pump intake.

3. The pump unit of claim 1 further including receiving means for receiving said signal, and display means responsive to said signal for displaying the relative location of said hydrocarbon/water interface relative to said pump intake.

* * * * *